United States Patent
Sakhardande et al.

(10) Patent No.: US 8,990,763 B2
(45) Date of Patent: Mar. 24, 2015

(54) USER EXPERIENCE MATURITY LEVEL ASSESSMENT

(71) Applicant: Tata Consultancy Services Limited, Mumbai, Maharashtra (IN)

(72) Inventors: Prachi Sakhardande, Maharashtra (IN); Rajiv Thanawala, Maharashtra (IN)

(73) Assignee: Tata Consultancy Services Limited, Mumbai (IN)

( * ) Notice: Subject to any disclaimer, the term of this patent is extended or adjusted under 35 U.S.C. 154(b) by 205 days.

(21) Appl. No.: 13/692,281

(22) Filed: Dec. 3, 2012

(65) Prior Publication Data

US 2013/0254735 A1 Sep. 26, 2013

(30) Foreign Application Priority Data

Mar. 23, 2012 (IN) .......................... 790/MUM/2012

(51) Int. Cl.
*G06T 11/20* (2006.01)
*G06F 9/44* (2006.01)
(Continued)

(52) U.S. Cl.
CPC . *G06F 8/77* (2013.01); *G06Q 30/00* (2013.01)
USPC .......... 717/100; 345/440; 717/125; 717/127; 717/131; 717/174; 718/104

(58) Field of Classification Search
CPC . H04L 63/08; H04L 63/0807; H04L 63/0815; H04L 63/168; H04L 63/20; G06Q 30/02; G06F 17/30864; G06F 8/20; G06F 8/34; G06F 8/35; G06F 8/77; G06F 11/34; G06F 11/079; G06F 11/3688; G06F 8/71; G06F 11/3409; G06F 11/3616; G06F 11/3668; G06F 11/3672
See application file for complete search history.

(56) References Cited

U.S. PATENT DOCUMENTS 6,256,773 B1 * 7/2001 Bowman-Amuah .......... 717/121
6,536,037 B1 * 3/2003 Guheen et al. ................ 717/151
(Continued)

FOREIGN PATENT DOCUMENTS

WO  WO 2011138793 A1 * 11/2011 ............. G06Q 40/00

OTHER PUBLICATIONS

Rafa E. Al-Qutaish et al., A Maturity Model of Software Product Quality, Nov. 2011, vol. 43 No. 4, [Retrieved on Jan. 27, 2014]. Retrieved from the internet: <URL: http://www.acs.org.au/_data/assets/pdf_file/0010/10126/A-Maturity-Model-of-Software-Product-Quality_JRPIT43.4.307.pdf> 21 Pages (307-327).*

(Continued)

*Primary Examiner* — Don Wong
*Assistant Examiner* — Anibal Rivera
(74) *Attorney, Agent, or Firm* — Hamre, Schumann, Mueller & Larson, P.C.

(57) ABSTRACT

The present subject matter provides a system and a method for assessing user experience maturity (UXM) level for a software product. The method includes defining a set of hierarchical UXM levels that may be associated with one or more user experience (UX) parameters. Each of the one or more UX parameters may be assigned a weight based on relevance of the each of the one or more UX parameters. In addition, the method may include determining ratings for the each of the one or more UX parameters and evaluating a UXM score of the software product based on the ratings. Moreover, the method may include categorizing the software product in one of the hierarchical UXM levels based on the UXM score of the software product. The software product may be categorized if the UXM score is greater than a pre-defined threshold value for that hierarchical UXM level.

21 Claims, 4 Drawing Sheets

(51) Int. Cl.
  *G06F 9/445* (2006.01)
  *G06F 9/46* (2006.01)
  *G06Q 30/00* (2012.01)

(56) References Cited

U.S. PATENT DOCUMENTS

| | | | | |
|---|---|---|---|---|
| 6,662,357 | B1* | 12/2003 | Bowman-Amuah | 717/120 |
| 2001/0052108 | A1* | 12/2001 | Bowman-Amuah | 717/1 |
| 2004/0268341 | A1* | 12/2004 | Kenworthy | 717/174 |
| 2006/0070037 | A1* | 3/2006 | Canning et al. | 717/127 |
| 2006/0070077 | A1* | 3/2006 | Erlandson et al. | 718/104 |
| 2008/0115110 | A1* | 5/2008 | Fliek et al. | 717/125 |
| 2010/0073373 | A1* | 3/2010 | Groff et al. | 345/440 |
| 2011/0066893 | A1* | 3/2011 | Bassin et al. | 717/131 |

OTHER PUBLICATIONS

"Mobile Application Design Best Practices"; Mike Gualtieri, Mike Gilpin, Jeffrey S. Hammond, and Adam Knoll Apr. 12, 2011.

"User Experience Metric and Index of Integration: Measuring Impact of HCI Activities on User Experience"; Anirudha Joshi and Sanjay Tripathi I-USED '08, Sep. 24, 2008, Pisa, Italy.

"Framework of Product Experience"; Pieter Desmet and Paul Hekkert Mar. 30, 2007.

* cited by examiner

USER EXPERIENCE MATURITY LEVEL ASSESSMENT

TECHNICAL FIELD

The present subject matter relates, in general, to user experience assessment, and in particular, to assessment of user experience maturity level of software products.

BACKGROUND

Software products have become an essential part of day-to-day activities. A software product may be described as a collection of computer programs, procedures, and documentation that perform tasks on a computer system. Presently, various organizations, such as Information Technology (IT) organizations, deal with development of a plurality of software products. Therefore, efficient development of the software products is one of the most important keys for success of an organization. It is important for such organizations to pay attention to building, maintaining, and enhancing their capabilities in developing and upgrading the software products and providing services through the plurality of software products in a systematic manner in order to attend to organizational and user needs.

Various software products, such as websites, programs, and games are available in the market today. Due to rapid changes that occur in the technology landscape, the software products have to be differentiated not only on the basis of their functionality but also by taking into consideration user experience. However, typical software development and assessment processes do not take into account the user experience aspect.

SUMMARY

This summary is provided to introduce concepts related to user experience maturity level assessment, which is further described below in the detailed description. This summary is neither intended to identify essential features of the claimed subject matter nor is it intended for use in determining or limiting the scope of the claimed subject matter.

In an embodiment, method(s) and system(s) for user experience maturity (UXM) level assessment of a software product is described herein. In an implementation, the method may include defining a set of hierarchical UXM levels. The hierarchical UXM levels indicate a progressive increase in the UXM. The method may further include associating one or more user experience (UX) parameters with each of the hierarchical UXM levels. Each of the one or more UX parameters may be assigned a weight based on relevance of the each of the one or more UX parameters. In addition, the method may include determining ratings for the each of the one or more UX parameters. Furthermore, the method may include evaluating a UXM score of the software product based on the ratings. Moreover, the method may include categorizing the software product in one of the hierarchical UXM levels based on the UXM score of the software product. In an implementation, the software product may be categorized if the UXM score is greater than a pre-defined threshold value for that hierarchical UXM level.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
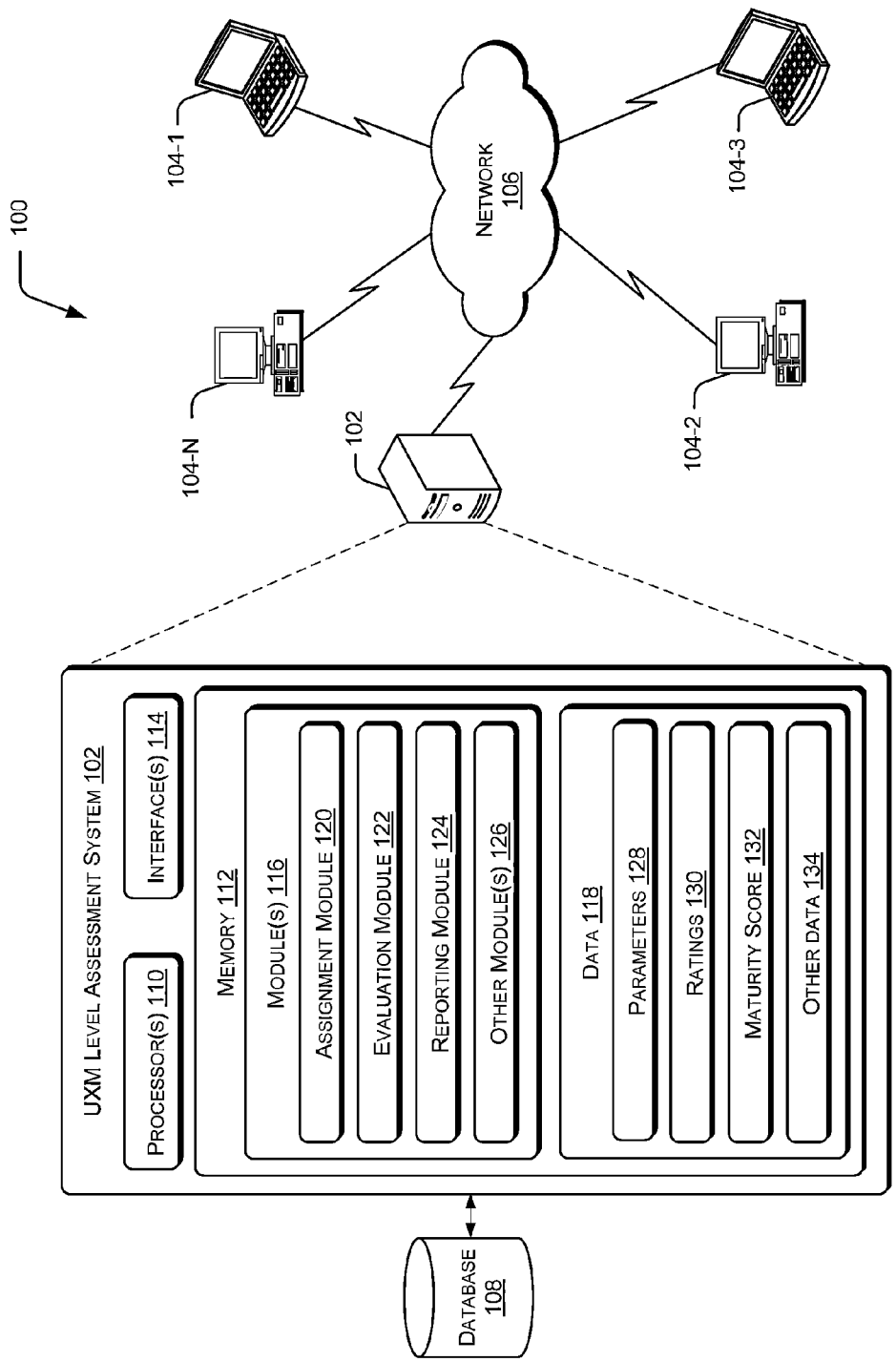
FIG. 1 illustrates a network environment implementation of a user experience maturity (UXM) level assessment system, in accordance with an embodiment of the present subject matter.

System and method for assessing user experience maturity (UXM) level for a software product are described herein. Examples of the software product may include, but are not limited to, a software application and a website. Further, user experience (UX) refers to a user's perceptions and responses that result from the use or anticipated use of a product, a system, or a service. The UX of the product depends upon, for example, user's requirements, user's emotions, expectations from the software product, and context of use.

The UX as described above may be understood to be a sub-set of customer experience (CX). Typically, CX relates to various interactions of the customer from the time the product is unveiled to the customers till the time the product is discarded. In other words, the CX may include interactions, such as packaging, marketing, customer support, and retail experience, in addition to the product specific attributes. The UX on the other hand refers to the experience that users have while interacting with the product, for example, through a graphical user interface (GUI). Users generally interact with a product for a variety of reasons, for example, to find content, complete tasks and achieve specific goals. Various parameters that influence this experience include usability, persuasiveness, branding, differentiation, and the capability to delight end users.

Currently, various evaluation techniques are available for determining usability of the software products. These evaluation techniques include heuristics, checklists, and user test methodologies for identifying flaws in the usability of the software products. In an example, psychometric methods are adapted by the current evaluation techniques to determine the usability of the software products. The psychometric methods may include questionnaires that may be employed for measuring user satisfaction with the software products' usability. In an example, a questionnaire for user interaction satisfaction (QUIS) is available to assess users' subjective satisfaction with specific aspects of the human-computer interface.

In another example of a conventional technique, the usability of the software products may be measured by giving numerical scores to the software products. The numerical scores may be provided by utilizing a scale, such as a system usability scale (SUS) that enables subjective assessment of the usability of the software products. In yet another example, expert review may be taken into consideration in which two to three analysts evaluate the software products with reference to established guidelines and note down their observations with respect to the usability of the software products. As will be understood by the above examples, the current evaluation techniques provide a measure of the usability of the software products; however, the evaluation techniques are unable to measure other aspects of the UX, such as emotional response of users and desirability of the software products.

Further, the evaluation techniques generally focus at just one dimension of the UX. For example, an evaluation technique may focus on brand identity and feature richness of the software products, another evaluation technique may assess design of the software products, such as whether the design is meeting user goals and established business objectives or not. Yet another evaluation technique may judge user interface of the software products to identify compliance with recognized usability principles and industry best practices. Accordingly, the present day evaluation techniques lack a cohesive model for assessing various facets of the UX and are focused on one aspect of the UX.

Moreover, as described above, different evaluation techniques use different measures, such as questionnaires and scales, for measuring the usability of the software products. For example, questionnaires may be used by one evaluation technique and scales may be used by another evaluation technique. This may result in capturing ephemeral notions of the users and not the complete UX with respect to the software products. While the present day evaluation techniques may be used to analyze different aspects of the UX, the present day evaluation techniques are incapable of providing a single framework that may serve as a standard measure of UXM in various software products, irrespective of technology, function, and domain.

In various implementations, the present subject matter discloses a system and a method for assessing UXM level of a software product. In order to assess the UXM level of the software product, the system may define a UXM model (UXMM). The UXMM may facilitate in assessment of the UXM level of the software product. In an implementation, the UXMM may define a set of hierarchical UX maturity levels. The hierarchical UXM levels indicate progressive increase in the UXM. For example, the set of hierarchical UXM levels may include a first level (L1), a second level (L2), a third level (L3), and a fourth level (L4). As mentioned above, the levels L1 to L4 are in the order of hierarchy with L1 indicating a lowest level of UXM, L2 indicating a first intermediate level of UXM, L3 indicating a second intermediate level of UXM, and L4 indicating a highest level of UXM.

In an implementation, each of the hierarchical UXM level within the model may indicate a capability of the software product. For example, a software product may be categorized in L1, if the software product is assessed to be designed for addressing a particular problem and may not be useful otherwise. In case the software product is unable to meet the conditions of L1, the software product may not qualify as usable. The software product may be categorized in L2, by the UXMM, if the software product is assessed to be useful; however, the software product may lack differentiating aspects with respect to its competitors. Similarly, the software product may be categorized in L3 if the software product may be found to be a market leader and may have an edge over the competitors. Finally, the software product may be categorized in L4 if the users are extremely satisfied to use the software product. In one implementation, the system of the present subject matter may be configured to assess the software product for a UXM level only when the software product has been assessed to belong to a lower UXM level, if any. For example, a software product is assessed for L2 only when the software product has met the criteria for L1. This may facilitate in assessing the increasing maturity of the UX of the software product with each hierarchical UXM level.

For the categorization, the UXMM of the system may be configured to associate each of the hierarchical UXM levels with one or more UX parameters. The one or more UX parameters may facilitate assessment of the UXM level of the software product. In an implementation, the one or more UX parameters may be referred as a skill set that may demonstrate different levels of capabilities in the software product. The one or more UX parameters as described in the present subject matter may serve as a basis of the UXMM. In an embodiment, the UXMM may include 14 UX parameters based on which the software product may be assessed. The 14 UX parameters may include, Ease of Use, Speed of Use, Learnability, Consistency, Content, Accessibility, Flexibility, Aesthetics, Recovery from Errors, Help, Brand Recall, Persuasiveness, Differentiator, and Greater Good. The each of the one or more UX parameters may be assigned a weight according to the importance of the one or more UX parameters with respect to the software product. Moreover, some of the one or more UX parameters may be common for multiple UX levels.

In an implementation, each of the one or more UX parameters of the UXMM may include a plurality of attributes. In other words, each of the one or more UX parameters may be broken down into a plurality of attributes based on which the UXM of the software product may be judged. For example, the plurality of attributes may be in the form of a plurality of review questions that may be used for creating an assessment questionnaire at each hierarchical UXM level. In the present implementation, the UXMM may include a matrix based on the UX parameters and the plurality of attributes associated with each of the UX parameters across the four levels of UXM. The matrix may facilitate in generation of an assessment questionnaire for the software product at each hierarchical UXM level.

Further, the present subject matter facilitates providing ratings, such as from users, to each of the plurality of attributes while assessing the software product for each of the hierarchical UXM levels, such as L1 to L4. The ratings for each of the plurality of attributes may be based on various analysis techniques employed by the system depending upon the UXM level for which the software product is being assessed. For example, when the software product is being assessed for L1, the ratings may be provided on the basis of evaluation that may be carried out by experts on the basis of a pre-defined checklist. In case of L2, the software product may be provided ratings by creating test-scenarios that may imitate real life use scenarios. Further, for assessing the software product for L3, the software product may be benchmarked against various competitors. In addition, when the software product may be assessed for L4, emotional response of users may be considered before providing ratings to the software product. Accordingly, different analysis techniques are employed for different hierarchical UXM levels.

Furthermore, based on the ratings provided to each of the plurality of attributes, the system may determine ratings provided to each of the one or more UX parameters. In an implementation, the present subject matter describes computation of a mean value of the ratings associated with each of the plurality of ratings of a UX parameter. This mean value may be considered as a rating of the UX parameter having the plurality of attributes. Further, in accordance with an implementation, based on the ratings determined for each of the one or more UX parameters, a numerical score may be evaluated by the system for each hierarchical UXM level.

In an implementation, the system may evaluate the numerical score by calculating a weighted average of each of the one or more UX parameters associated with a hierarchical UXM level. The weighted average may be considered as a UXM score of the software product for that UXM level. Further, a pre-defined threshold value may be indicated for each of the hierarchical UXM level. If the UXM score of the software product exceeds the pre-defined threshold value for a hierarchical UXM level, the software product may be assessed for a higher hierarchical UXM level in a similar manner. However, if the UXM score of the software product is less than the pre-defined threshold value the software product may be categorized in a lower hierarchical UXM level, if any. For example, if the software product is being assessed for L1 and the UXM score of the software product is less than the pre-defined threshold value for that level, the software product will be considered as not usable as L1 is the lowest hierarchical UXM level. In remaining three levels of the hierarchy, if the UXM score for that level is less than the pre-defined threshold value, the software product is categorized in a lower hierarchical UXM level.

In addition, the system of the present subject matter may be configured to report various shortcomings of the software product due to which the software product could not qualify for the higher hierarchical UXM level. In addition, the system may facilitate suggesting various ways to overcome the shortcomings and improve the software product so that the software product may move up across the hierarchical UXM levels. Moreover, the system may also be configured to compare the UX associated with two or more software products that may or may not be similar. In an implementation, the UXM level for the two or more products may be computed separately. As the present subject matter provides a single framework for assessing the UX, the software product categorized in a higher UXM level may be considered as providing a better UX when compared to another software product categorized in a lower UXM level.

Accordingly, the present subject matter describes a system and a method for assessing a UXM of a software product. The software product may be assessed for being categorized in one of the hierarchical UXM levels based on the capabilities of the software product. Further, the present subject matter may take into account other dimensions in addition to usability of the software product, such as branding, differentiation, persuasiveness, and emotional influence while assessing the UXM level of the software product. In addition, the UXMM may define a plurality of attributes associated with each of the one or more UX parameters that may facilitate in conducting an objective assessment of the software product at each UXM level.

Moreover, the UXMM may be configured to be scalable, i.e., the UXMM may be capable of perform efficiently even when the UX parameters or attributes are increased. For example, the UXMM may be configured in manner that additional UX parameters, attributes, and UXM levels may be defined within the UXMM at a later point of time based on the requirements of the software products being assessed. Furthermore, the present subject matter may facilitate assessment and comparison of the UXM levels of different software products. Finally, the present subject matter may provide a roadmap for enhancement of UX at a particular UXM level or for movement to the next UXM level.

These and other advantages of the present subject matter would be described in greater detail in conjunction with the following figures. While aspects of described systems and methods for user experience maturity level assessment can be implemented in any number of different computing systems, environments, and/or configurations, the embodiments are described in the context of the following exemplary system(s).

Figure 1A:
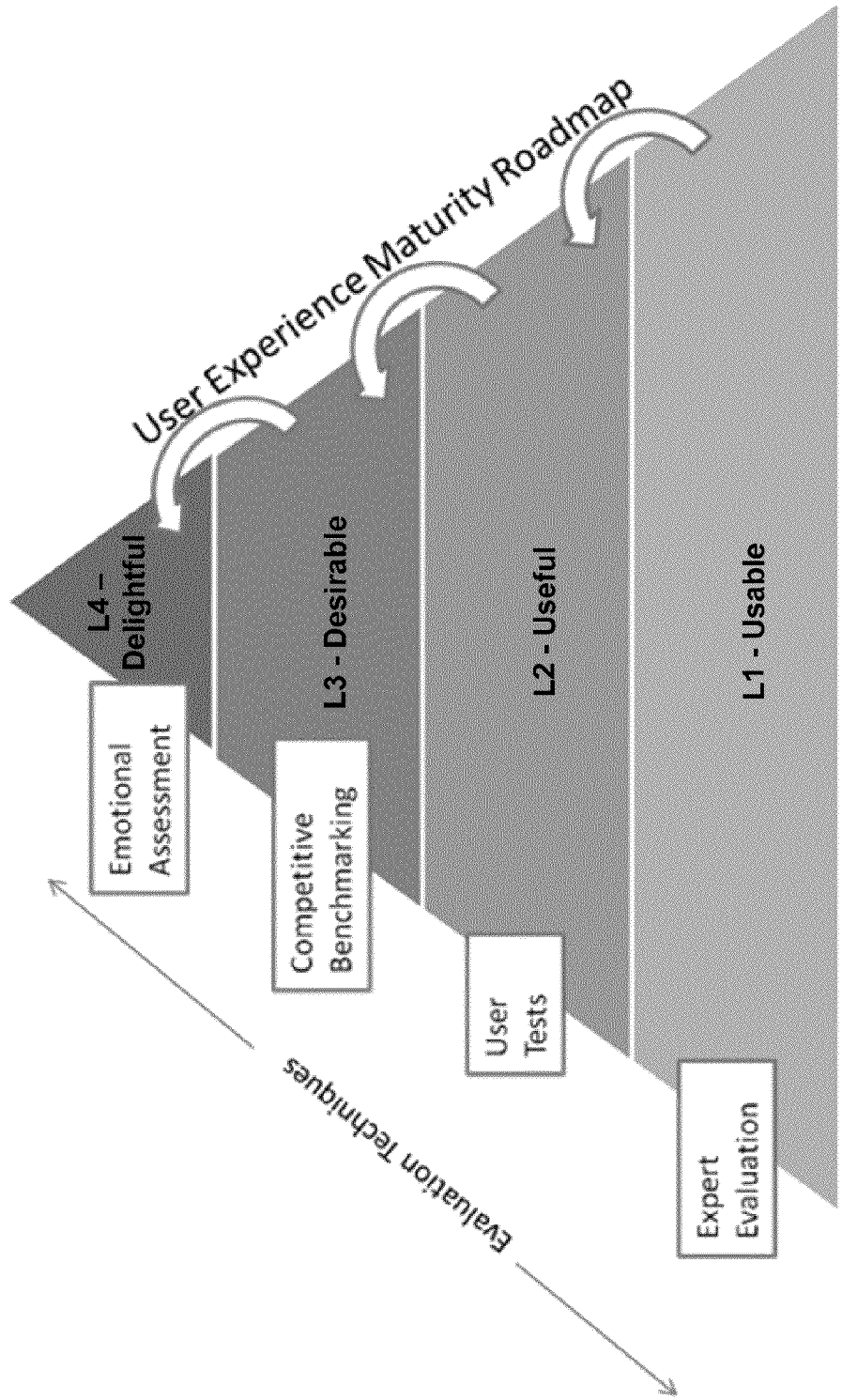
FIG. 1a illustrates a UXM model having the hierarchical UXM levels and various evaluation techniques for categorizing a software product in each of the hierarchical UXM levels, in accordance with an embodiment of the present subject matter.

FIG. 1 illustrates a network environment 100 implementing a user experience maturity (UXM) level assessment system 102, in accordance with an embodiment of the present subject matter, whereas FIG. 1a illustrates a UXM model having the hierarchical UXM levels and various evaluation techniques for categorizing a software product in each of the hierarchical UXM levels, in accordance with an embodiment of the present subject matter. In said embodiment, the network environment 100 includes the UXM level assessment system 102 configured to assess a UXM level of a product, such as a software product.

In one implementation, the network environment 100 may be a company network, including thousands of office personal computers, laptops, various servers, such as blade servers, and other computing devices. Examples of a company may include an information technology (IT) company, a product manufacturing company, a human resource (HR) company, a telecommunication company, or other large conglomerates. It will also be appreciated by a person skilled in the art that the company may be any company involved in any line of business. In another implementation, the network environment 100 may be a smaller private network. In yet another implementation, the network environment 100 may be a public network, such a public cloud.

The UXM level assessment system 102 may be implemented in a variety of computing systems, such as a laptop computer, a desktop computer, a notebook, a workstation, a mainframe computer, a server, a network server, and the like. In one implementation, the UXM level assessment system 102 may be included within an existing information technology infrastructure or a database management structure. Further, it will be understood that the UXM level assessment system 102 may be connected to a plurality of user devices 104-1, 104-2, 104-3, . . . , 104-N, collectively referred to as the user devices 104 and individually referred to as a user device 104. The user device 104 may include, but is not limited to, a desktop computer, a portable computer, a mobile phone, a handheld device, and a workstation. The user devices 104 may be used by users, such as database analysts, programmers, developers, data architects, software architects, module leaders, projects leaders, database administrator (DBA), stakeholders, and the like.

As shown in the figure, the user devices 104 are communicatively coupled to the UXM level assessment system 102 over a network 106 through one or more communication links for facilitating one or more end users to access and operate the UXM level assessment system 102. In one implementation, the network 106 may be a wireless network, a wired network, or a combination thereof. The network 106 may also be an individual network or a collection of many such individual networks, interconnected with each other and functioning as a single large network, e.g., the Internet or an intranet. The network 106 may be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include a variety of network devices, including routers, bridges, servers, computing devices, storage devices, and the like.

In an implementation, the UXM level assessment system 102 may be coupled to a database 108. Although not shown in the figure, it will be understood that the database 108 may also be connected to the network 106 or any other network in the network environment 100. In an implementation, the database 108 may include a user experience maturity model (UXMM) of the UXM level assessment system 102. In an implementation, the database 108 may be provided as a relational database and may store data in various formats, such as relational tables, object oriented relational tables, indexed tables. However, it will be understood that the database 108 may be provided as other types of databases, such as operational databases, analytical databases, hierarchical databases, and distributed or network databases.

In an implementation, the UXM level assessment system 102 includes a processor(s) 110 coupled to a memory 112. The UXM level assessment system 102 further includes interface(s) 114, for example, to render a report, based on assessment of UX of a product. Further, the interface(s) 114 may include a variety of software and hardware interfaces, for example, interfaces for peripheral device(s), such as a keyboard, a mouse, an external memory, and a printer. Additionally, the interface(s) 114 may enable the UXM level assessment system 102 to communicate with other devices, such as web servers and external repositories. The interface(s) 114 may also facilitate multiple communications within a wide variety of networks and protocol types, including wired networks, for example, LAN, cable, etc., and wireless networks, such as WLAN, cellular, or satellite. For the purpose, the interface(s) 114 may include one or more ports.

The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 may be configured to fetch and execute computer-readable instructions stored in the memory 112.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 112 includes module(s) 116 and data 118.

The module(s) 116 include, for example, an assignment module 120, an evaluation module 122, a reporting module 124, and other module(s) 126. The other module(s) 126 may include programs or coded instructions that supplement applications or functions performed by the UXM level assessment system 102.

The data 118 may include parameters 128, ratings 130, maturity score 132, and other data 134. The other data 134, amongst other things, may serve as a repository for storing data that is processed, received, or generated as a result of the execution of one or more modules in the module(s) 116. Although the data 118 is shown internal to the UXM level assessment system 102, it may be understood that the data 118 can reside in an external repository (not shown in the figure), which may be coupled to the UXM level assessment system 102. The UXM level assessment system 102 may communicate with the external repository through the interface(s) 114 to obtain information from the data 118.

As mentioned herein, the present subject matter discloses a system and method for assessing a user experience maturity (UXM) level of a software product. The user experience (UX) may refer to a user's perceptions and responses that result from the use or anticipated use of the product, a system, or a service. The UX of the software product may depend upon, for example, user's requirements, user's emotions, expectations from the product, and context of use. With respect to the present subject matter, the term UX may imply the experience while users interact with the software product through a graphical user interface (GUI).

The UX may be understood to be a sub-set of customer experience (CX). Typically, CX relates to various interactions of a customer from the time a product is unveiled to the customers till the time the product is discarded. In other words, the CX may include interactions, such as packaging, marketing, customer support, and retail experience, in addition to the product specific attributes. The UX on the other hand refers to the experience that users have while interacting with the product, for example through a graphical user interface (GUI). Users generally interact with the product for a variety of reasons, for example, to find content, complete tasks and achieve specific goals. Various parameters that influence this experience include usability, persuasiveness, branding, differentiation and the capability to delight end users.

The present subject matter may include UXM model (UXMM) that may include a set of hierarchical UXM levels. Further, each of the hierarchical UXM levels may be associated with one or more UX parameters based on which the software product may be assessed and ratings may be provided thereto. Further, a UXM score may be calculated on the basis of the ratings. The UXM score facilitates categorization of the software product in one of the hierarchical UXM levels.

According to an implementation, the assignment module 120 may be configured to define the set of hierarchical UXM levels. In said implementation, the assignment module 120 may define the UXMM that may be configured to further define the set of hierarchical UXM levels. The set of hierarchical UXM levels may define a plurality of UX levels in order of hierarchy. The hierarchy of the UXM levels may be based on the UX associated with the software product. Further, the hierarchical UXM levels indicate progressive increase in the UXM. In an implementation, the set of hierarchical UXM levels may include a first level (L1), a second level (L2), a third level (L3), and a fourth level (L4). As mentioned above, the levels L1 to L4 are in the order of hierarchy with L1 indicating a lowest level of UXM, L2 indicating a first intermediate level of UXM, L3 indicating a second intermediate level of UXM, and L4 indicating a highest level of UXM. The hierarchical UXM levels may facilitate assessment of UX and may enable enhancement of the software product to a higher UXM level.

In an implementation, each of the hierarchical UXM level proposed by the UXMM may indicate how well the software product caters to different aspects of UX. For example, the lowest UXM level L1 may indicate that the software product in this level may be usable. The software product in the lowest UXM level may be considered to be designed in accordance with basic design principles and best practices. However, the software product categorized in L1 may not be designed by keeping in mind end user considerations. In other words, the software product may be assessed to be designed for addressing a particular issue and may not be useful otherwise. This may make the software product not up to the expectations of the users. Further, a higher level, such as L2, of the hierarchical UXM levels as defined by the UXMM may represent usefulness of the software product. The software product if categorized in this level may be understood to be configured to enable the users to accomplish their tasks and goals with ease, efficiency, and accuracy. The useful software product may be understood as one which has been designed with an inherent goal to fulfill specific user needs in an efficient manner. However, the software product in L2 may lack any differentiating aspects with respect to various competitors.

In the present implementation, a next higher level, such as L3 as defined by the UXMM may indicate desirability of the software product. The software product falling under this level may be considered as market leaders. Such a software product may be expected to provide better UX as compared to their current competitors. Therefore, such software product may be considered to have an edge in the market. In addition, the highest level, such as L4, of the hierarchical UXM levels represents delight that may be experienced by the users. The software product that may be categorized in L4 by the UXM level assessment system 102 may be considered to build a cult following. Furthermore, such software products may inspire a sense of loyalty among the users. The different hierarchical UXM levels as described above are illustrated in FIG. 1a.

The assignment module 120 may further be configured to associate one or more UX parameters with each of the hierarchical UXM level. The one or more UX parameters may indicate the UX maturity of the software product at each level. Also, the one or more parameters may indicate how these UX parameters are co-related across different hierarchical UXM levels. In an implementation, the UXMM employs 14 UX parameters as listed in Table 1 below.

TABLE 1

User Experience (UX) Parameters

| | |
|---|---|
| 1. | Ease of Use |
| 2. | Speed of Use |
| 3. | Learnability |
| 4. | Consistency |
| 5. | Content |
| 6. | Accessibility |
| 7. | Flexibility |
| 8. | Aesthetics |
| 9. | Recovery from Errors |
| 10. | Help |
| 11. | Brand Recall |
| 12. | Persuasiveness |
| 13. | Differentiator |
| 14. | Greater Good |

Further, the assignment module 120 may facilitate assigning a weight to each of the UX parameters corresponding to the importance of the each of the one or more UX parameters. In cases, where no weight is assigned to a UX parameter, the assignment module 120 may define a default weight of '1' to that UX parameter. The UX across the one or more UX parameters may be measured using various analyses techniques that may be suitable for each of the hierarchical UXM level. In an implementation, the each of the UX parameters may include a plurality of attributes. For example, the each of the UX parameters may include a plurality of review questions that may be used for creating an assessment questionnaire at each hierarchical UXM level. An exemplary list that broadly defines the plurality of attributes of the each of the UX parameters is provided in Table 2 below.

TABLE 2

| UX Parameters | Attributes |
|---|---|
| 1. Ease of Use | Ease of access |
| | Adaptation to user needs |
| | Visibility of System Status |
| | Context of current location |
| | Ease of Data Input |
| | Navigation |

TABLE 2-continued

| UX Parameters | Attributes |
|---|---|
| 2. Speed of Use | Optimized task completion |
| | Optimized Search Function |
| | Recognition Rather Than Recall |
| | Performance |
| 3. Learnability | Well designed affordances & standard behavior |
| | Simplifying complex tasks |
| | Designing for Perpetual Intermediates |
| 4. Consistency | Consistent Look & Feel |
| | Consistent Behavior |
| | Consistent Placement |
| 5. Content | Clarity |
| | Communicating Errors |
| 6. Accessibility | Level A certified |
| 7. Flexibility | Flexible data entry |
| | Flexible User Authentication |
| 8. Aesthetics | Legibility of content |
| | Data Grids Legibility |
| | Imagery |
| | Visual Consistency |
| 9. Recovery from Errors | Revert to previous state |
| | Offer Alternates |
| | Error Recognition |
| 10. Help | Provision of on demand help at all times |
| | Ease of accessing help |
| 11. Brand Recall | Successful extension of the offline brand in the online realm |
| 12. Persuasiveness | Ability to induce positive changes in the user |
| | Ability to elicit extra effort from users to enrich the system |
| 13. Differentiator | Unique Selling Point (s) that influence user experience |
| 14. Greater Good | Customer loyalty by contributing to a greater good |

The above-mentioned attributes for each of the UX parameters may facilitate assessment of the software product, and categorization thereof in one of the hierarchical UXM levels. For example, ease of use may identify whether or not the GUI of the software product is intuitive enough to be used without external aids, such as user manual or human intervention. The speed of use parameter may identify whether or not the GUI facilitates a smooth interaction with applications enabling the users to accomplish goals in a minimal timeframe. Further, the Learnability parameter may assess whether the UX is based on predictable visual and interaction patterns or not.

Consistency of the software product may be measured by determining whether the software product works and behaves in a consistent manner or not. Similarly, content of the software product may be measured, such as whether the GUI of the software product communicates information, warnings, and error messages in a correct and appropriate manner or not. Furthermore, the software product may be assessed for other parameters, such as accessibility, flexibility for reducing manual errors, aesthetics, recovery from errors, persuasiveness, differentiator, and greater good to determine the UX maturity of the software product. The assignment module 120 may also be configured to store information related to the one or more UX parameters, such as the attributes associated with each of the UX parameters and weights assigned to each of the UX parameters as parameters 128.

In an implementation, the UXMM of the UXM level assessment system 102 may include a matrix that may be formed on the basis of the UX parameters and associated attributes. The matrix may indicate various requirements that the UX parameters should fulfill across the hierarchical UXM levels. Table 3 below indicates the requirements that the first UX parameter should fulfill across the four levels of maturity.

TABLE 3

| UX Parameter | Attributes | L1 - Useable | L2 - Useful | L3 - Desirable | L4 - Delightful |
|---|---|---|---|---|---|
| Ease of Use | Ease of access | L1A1: Is the system designed to provide easy access to primary content and functionalities? | L2A1: Are users able to quickly access the content or features required to accomplish tasks? | L3A1: Is the system better designed as compared to peers to provide easy access to primary content and functionalities? | L4A1: Did the users feel the system was simple and intuitive? |
| | Adaptation to user needs | L1A2: Does the system adapt well to user's needs? | L2A2: Are the customization/personalization features used by end users during task completion? | L3A2: Does the system adapt well to user's needs as compared to peers? | L4A2: Did users express delight at any of the customization/personalization features? |
| | Visibility of System Status | L1A3: Does the system provide a clear indication of the current state at all times? | L2A3: Are users aware of status of a task at all times on the application? | L3A3: Does the system provide a clear indication of the current state at all times as compared to peers? L3A4: Does the system consistently indicate user location and context at all times as compared to peers? | NA |
| | Context of current location | L1A4: Does the system consistently indicate user location and context at all times? | L2A4: Were users able to know their current position in the application at all times? L2A5: Were users able to retrace their steps at all times? | L3A4: Does the system consistently indicate user location and context at all times as compared to peers? | NA |
| | Ease of Data Input | L1A5: Is Data entry on the system designed for simplicity? | L2A6: Were users able to accomplish data entry tasks without errors? | L3A5: Is Data entry on the system designed for simplicity as compared to peers? | L4A3: Do users display any positive emotions while carrying out data entry? |
| | Navigation | L1A6: Are navigational menus fairly indicative of the underlying content? | L3A6: Are navigational menus better designed as compared to peers? | L3A6: Are navigational menus better designed as compared to peers? | L4A4: Do users feel navigation across the site easy and intuitive? |

A first column of table 3 lists the UX parameter under consideration. A second column may include a list of attributes that may be associated with each of the UX parameters. Further, each attribute may be further elaborated in the form of questions that may be asked to the user across the hierarchical UXM levels for accessing the software product. It will be understood that although Table 3 has been described with reference to the attributes of one UX parameter, the subject matter is implemented to do the same for the remaining parameters as mentioned in Table 1. In accordance with the present implementation, the UXMM may be configured as a scalable model. In other words, the UXMM may facilitate addition of hierarchical UXM levels, various UX parameters, and attributes at a later point in time based on the requirement of the software product.

As mentioned above, the UX across each of the UX parameters may be measured by performing formative and summative analysis, such as heuristic analysis, test-scenario based analysis, and emotional analysis, for each of the hierarchical UXM level. The UXM level assessment system 102 employs a different analysis technique for each of the hierarchical UXM levels. For example, while assessing the software product for usefulness at level L1, an evaluation may be carried out by the experts on the basis of a pre-defined checklist. The pre-defined checklist may be derived from a combination of UX heuristics and other attributes that may influence usability of the software products. Further, the experts may perform formative and summative analyses on the software product.

Furthermore, at L2, the software product may be assessed for their usefulness. In an example, a usability scale, such as a system usability scale (SUS) may be used. The SUS may be based on forced-choice questions, such as statements in respect of which the answers need to be provided. The SUS includes scores for indicating the degree of agreement or disagreement with the statement. Considering that the SUS is a scale of 1 to 10, a score of 1 may indicate that the experts do not agree with the statement and a score of 10 may indicate may indicate that the experts agree with the statement.

In another example, the UXMM may facilitate evaluation of the software product in different test scenarios where the software product may be used by volunteers who represent end users. In other words, the analysis technique for L2 may include creation of mock-scenarios representing various environments in which the software product may be used. The volunteers may be asked to accomplish certain tasks using the software product in the various environments. The experts may observe the volunteers while performing the tasks. Based on the observations, the experts may extrapolate their findings across the one or more UX parameters. For example, the experts may analyze speed of completion of a task by the volunteers and note down the observations. Further, the experts may also note down any comments that may be provided by the volunteers while using the software product. These notes and observations may facilitate determination of the UXM level of the software product.

Moreover, at L3, the UXM level assessment system 102 may facilitate measurement of desirability of the software product by benchmarking the software product against the competitors prevalent in the market. The competitors that may be considered for benchmarking may be direct competitors (e.g., from same or similar domains) or software products from different domains that may provide similar services. For example, a digital camera interface may be compared with a mobile phone while evaluating an attribute of 'clicking digital photos'. Such an analysis may facilitate in assessing strengths and weaknesses of various current and potential competitors.

In an implementation, the competitor benchmarking exercise may include analysis of attributes by experts, analyzing the competitor software products by creating mock-scenarios, and the like. Further, some of the UX parameters may be specifically analyzed for competitor benchmarking, such as brand recall, persuasiveness, differentiation, and greater good. Accordingly, the competitor benchmarking may facilitate the UXM level assessment system 102 to identify distinguishing factors in the UX across the competitors. These distinguishing factors may facilitate to identify what features may make the software product desirable amongst the competitors.

Additionally, the UXM level assessment system 102 facilitates assessing delightfulness, at L4, experienced by the users while using the software product. The delightfulness of the software product may be measured by determining emotions and reactions of the users while using the software product. Various techniques may be used for determining the emotions, such as happiness, anger, and frustration, of the users. The faces questionnaire is one such technique which includes different photographs of faces, as the basis of questionnaire. For example, the photographs may include 5 different face expressions representing a wide array of emotions from joy to anger with a scale from 1 to 5, where 1 represented "Not at all like this" and 5 represented "Very much like this". The volunteers may provide the ratings on the scale that reflects how performing the tasks with the software product made them feel. Again referring to FIG. 1a, various analysis techniques with respect to each of the hierarchical UXM level are illustrated.

In another implementation, based on the above mentioned analysis techniques, the assignment module 120 may facilitate in providing ratings to each of the plurality of attributes of the each of the UX parameters. In an example, the ratings may be provided by the experts through the user devices 104. In said implementation, the ratings may be based on a frequency of occurrence of activities as described by the plurality of attributes. For example, if frequency of occurrence of an attribute is up to 10% (considered as not occurred), a rating of 1 may be provided to that attribute. Further, a frequency of about 10% to about 40% (considered as rarely occur) may be rated as 2, frequency of about 40% to about 50% (considered as sometimes occur) may be rated as 3, frequency of about 60% to about 80% (considered as most occurrences) may be rated as 4, and frequency of about 80% to about 100% (considered as always occurring) may be rated as 5. As will be understood from the above paragraphs, the experts may provide ratings to the each of the plurality of attributes based on the responses received from the users or from the volunteers. The assignment module 120 may also be configured to store the ratings provided to different attributes associated with each of the UX parameter as ratings 130.

In an implementation, the UXM level assessment system 102 may include an evaluation module 122. The evaluation module 122 may be configured to determine ratings associated with each of the one or more UX parameters based on the ratings associated with the each of the plurality of attributes. In said implementation, the rating for a UX parameter may be determined by calculating a mean value of the ratings associated with the attributes of that UX parameter. Accordingly, the mean value may be considered as the rating provided to the UX parameter. In another implementation, the evaluation module 122 may be configured to calculate deviation of the responses from the expected responses with respect to the software product. For example, the evaluation module 122 may facilitate calculation of standard deviation (SD) to identify how much the responses have deviated from predetermined values.

Further, the evaluation module 122 may be configured to evaluate the UXM score of the software product for a hierarchical UXM level. The UXM score of the software product may be calculated on the basis of the ratings determined for the UX parameters that may be applicable for that hierarchical UXM level. In an implementation, the evaluation module 122 may be configured to calculate a weighted average of the UX parameters associated with the hierarchical UX level for which the software product may be assessed. It will be understood that the weighted average may be calculated on the basis of the weights associated with the UX parameters and the ratings that may be determined for the UX parameters. This weighted average may be considered as the UXM score of the software product for the hierarchical UXM level under consideration. The UXM score obtained at different levels of assessment of the software product may be stored by the evaluation module 122 as the maturity score 132.

In another implementation, the evaluation module 122 may be configured to define a threshold value for each of the hierarchical UXM level. The threshold value may be defined to determine whether the software product may be categorized in a UXM level or not. Accordingly, the evaluation module 122 may determine whether the UXM score of the software product is greater than the threshold value or not. For example, if the threshold value of L1 is 50 and the UX score of the product is 79, the product is deemed to be useful on the basis of the UX parameters associated with L1. The evaluation module 122, in this case, may categorize the software product in L1. Referring to the above example, if the UXM score of the software product calculated to 45, the software product is not deemed to be useful and may not be categorized in any UXM level.

Further, Table 4 below provides an exemplary illustration of calculation of the UXM score for a software product that is being assessed for usability (L1). The table below includes a list of UX parameters, associated attributes, ratings provided by the experts, deviation from predetermined values, and the weights associated with each of the UX parameter according to one implementation of the present subject matter.

TABLE 4

| UX Parameter(s) | Attributes | Ratings | Mean | SD | Weight(s) |
|---|---|---|---|---|---|
| 1. Ease of Use | Ease of access | | 3.95 | 1.31 | 1 |
| | a) Do primary pages define the goals and functionalities users can accomplish with the application? | 4 | | | |
| | b) Do primary pages provide clear entry points for users to accomplish these goals or use these functions? | 4 | | | |
| | Adaptation to user needs | | | | |
| | a) Can user customize the interface as per her needs, if required? | 5 | | | |
| | b) Is personalized content available (if required)? | 4 | | | |
| | c) Does the system have any implicit personalization, based on user's current context? | 4 | | | |
| | d) Does the system have an ability to recognize a context and only show relevant features or content? | 4 | | | |
| | Visibility of System Status | | | | |
| | a) If a task [e.g. processing] takes reasonable time, is an appropriate message displayed on the UI? | 3 | | | |
| | b) Does system provide a confirmation of task completion? | 4 | | | |
| | c) Does system provide a clear indication if a task cannot be completed either due to system error or manual error? | 5 | | | |
| | Context of current location | | | | |
| | a) Is user given a context of her current location in the application? | 4 | | | |
| | b) Can user retrace their steps to the starting point from the current location? | 3 | | | |
| | c) Does system provide clear information of what a user can accomplish at the current location? | 4 | | | |
| | Ease of Data Input | | | | |
| | a) Are forms well designed and easy on the eye? | 4 | | | |
| | b) Is vertical scrolling prevented by dividing the long forms into small chunks? | 3 | | | |
| | c) Do multi-step user tasks state number of steps required upfront? | 3 | | | |
| | d) Are guidelines for task completion clear and complete? | 4 | | | |
| | e) Are form elements supplemented with lookups, auto suggest features etc where needed? | 5 | | | |
| | f) On data entry screens and dialog boxes, are dependent fields displayed only when necessary? | 5 | | | |
| | g) Are mandatory fields clearly distinguished from non-mandatory fields? | 3 | | | |
| | Navigation | | | | |
| | a) Are menu choices ordered in the most logical way, given the user, the item names, and the task variables? | 3 | | | |
| | b) Does the category name describe the content precisely? | 5 | | | |
| | c) Do menu categories immediately describe or expose sub categories? | 4 | | | |
| | d) Is the first word of each menu choice the most important? | NA | | | |
| | e) Are inactive menu items grayed out or omitted? | NA | | | |

As described earlier, the software product may not be analyzed on the basis of all of the UX parameters. For example, the software product being assessed for L1 may just be analyzed across some of the UX parameters from Table 1. Further, upon calculation of the weighted average on the basis of averages of the various attributes, the weighted average may be scaled to 100 to obtain a percentage value. In accordance with the ratings provided in the above table (Table 4), the weighted average or the UXM score of the software product comes out to be 79%. The threshold value for L1 is defined as 50%, which clearly indicates that the software product passes L1 and may be eligible for being assessed for L2.

In an implementation, the UXM level assessment system 102 may facilitate assessment of the UXM level in a continuum. In other words, if the UXM level assessment system 102 determines that the software product is eligible for being categorized in L1 then only assessment of the software product with respect to L2 may began otherwise the software product may be not be assessed for L2. For example, if the software product is being assessed for L3 and the UXM score of the software product is less than the threshold value for L3, The evaluation module 122 may categorize the software product in a lower hierarchical UXM level, i.e., L2.

The evaluation module 122 may further be configured to compare UX associated with two or more software products. For example, the evaluation module 122 may employ the UXMM to assess the UX of the two or more software products separately across the one or more UX parameters. As mentioned above, the two or more software products may belong to same or different technical domains. Further, the evaluation module 122 may then compute UXM scores for each of the two or more software products. Based on the UXM scores, each of the two or more software products is categorized in a hierarchical UXM level. As the present subject matter employs a single framework for assessing UXM of the software products, the UXMM may identify the software product categorized in a higher UX level to provide a better UX than the one categorized in a lower UXM level and may determine the UX maturity thereof.

In an implementation, the UXM level assessment system 102 may include a reporting module 124. The reporting module 124 may be configured to render shortcomings of the software products being assessed. In the present implementation, the reporting module 124 may generate a report based on the analysis of the UX parameters and evaluation of the UXM score. The report may highlight the shortcomings of the software product that may be identified on the basis of the UXM score of the software product. Further, the reporting module 124 may also be configured to provide suggestions in the report. For example, the report may include suggestions for overcoming the shortcomings of the software product when the UXM score is less than the pre-defined threshold value.

The UXMM as defined by the UXM level assessment system 102 may enable assessment of UXM by evaluating various aspects that constitute UX. As described above, each aspect of the UX may be measured using appropriate technique. Further, the progressive set of analysis techniques employed by the UXM level assessment system 102 may allow the software product to be assessed for the next level only when certain acceptable criteria of the lower level have been met by the software product. Accordingly, the UXM level assessment system 102 may be configured to eliminate any subjective bias as the present subject matter analyzes the UX in a continuum, therefore, the current UXM level may automatically become an indicator of the measure of the UX offered by the software product against the highest hierarchical UXM level L4.

Accordingly, the present subject matter describes a system and a method for assessing a UXM of a software product. The software product may be assessed for being categorized in one of the hierarchical UXM levels based on the capabilities of the software product. Further, the present subject matter may take into account other dimensions in addition to usability of the software product, such as branding, differentiation, persuasiveness, and emotional influence while assessing the UXM level of the software product. In addition, the UXMM may define a plurality of attributes associated with each of the one or more UX parameters that may facilitate in conducting an objective assessment of the software product at each UXM level.

Moreover, the UXMM may be configured to be scalable, i.e. the UXMM may be capable of perform efficiently even when the UX parameters or attributes are increased. For example, the UXMM may be configured in manner that additional UX parameters, attributes, and UXM levels may be defined within the UXMM at a later point of time based on the requirements of the software products being assessed. Furthermore, the present subject matter may facilitate assessment and comparison of the UXM levels of different software products. Finally, the present subject matter may provide a roadmap for enhancement of UX at a particular UXM level or for movement to the next UXM level.

Figure 2A:
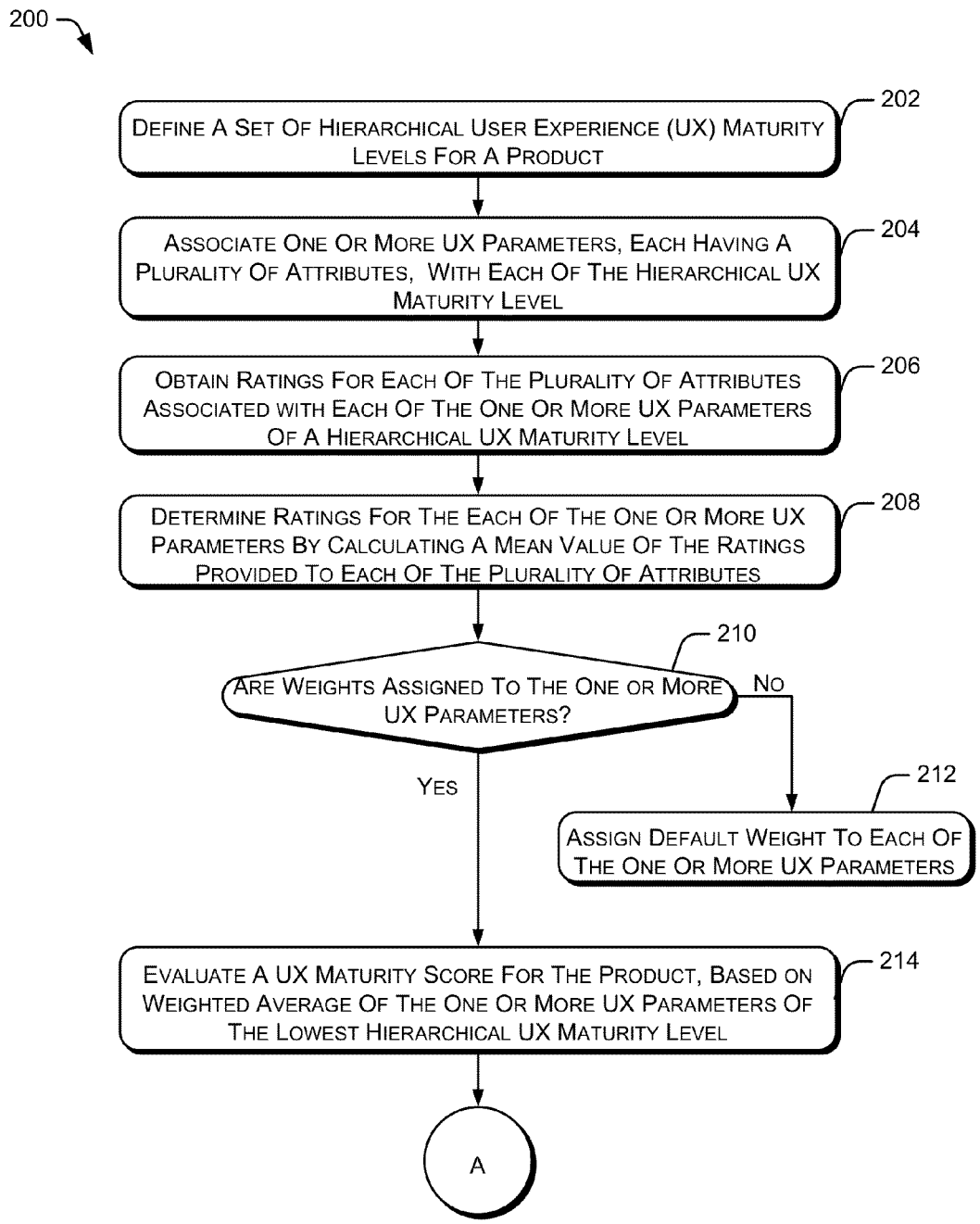
FIGS. 2a & 2b shows a flowchart illustrating a method for assessing the UXM levels of the software product, in accordance with an embodiment of the present subject matter.
Figure 2B:
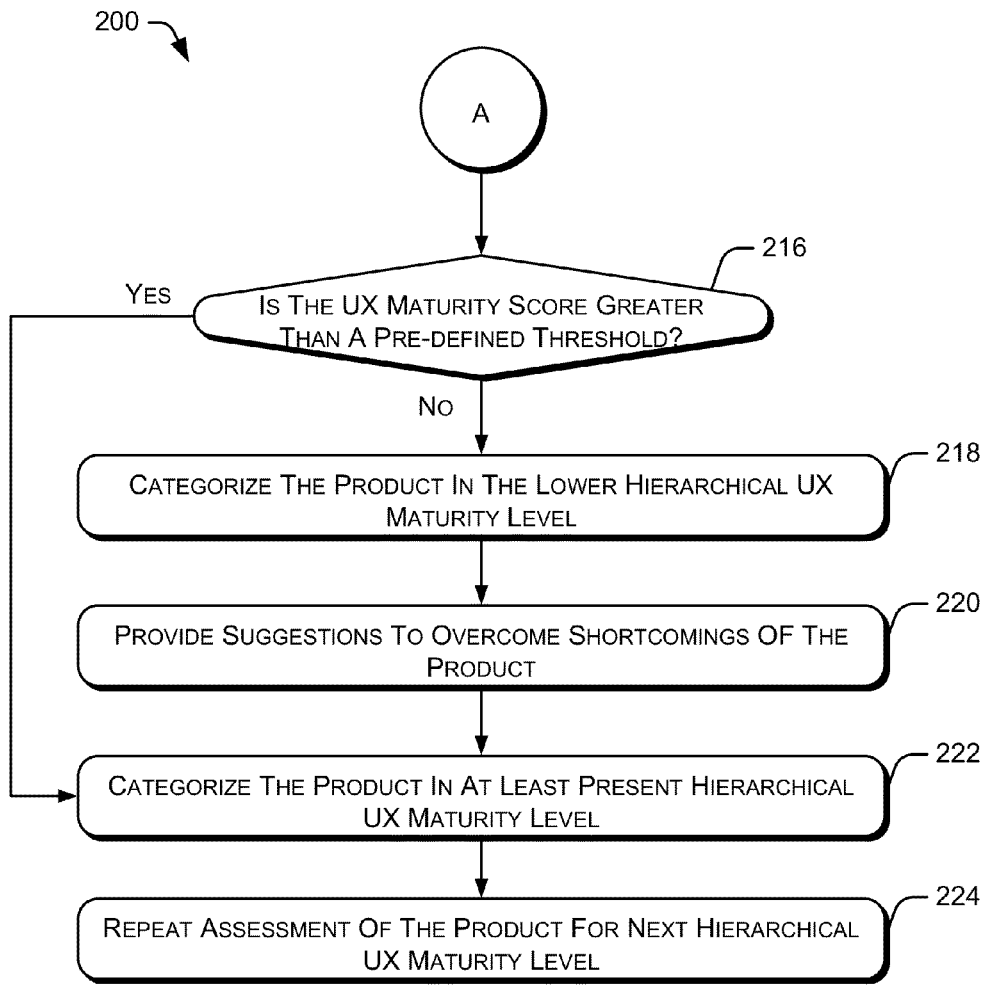

FIGS. 2a & 2b illustrate a method 200 for determining user experience maturity (UXM) of a software product, in accordance with an embodiment of the present subject matter. The method 200 may be described in the general context of computer executable instructions. Generally, computer executable instructions can include routines, programs, objects, components, data structures, procedures, modules, functions that perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

Referring to FIG. 2a, at block 202, a set of hierarchical UXM levels may be defined, such as by the assignment module 120. It will be understood that the hierarchical UXM levels are defined for the software product for assessing the UXM. Further, the hierarchical UXM levels indicate progressive increase in the UXM. In an implementation, the hierarchical UXM levels may include four levels, such as L1, L2, L3, and L4 indicating a usable level, a useful level, a desirable level, and a delightful level respectively. As mentioned above, the levels L1 to L4 are in the order of hierarchy with L1 indicating a lowest level of UXM, L2 indicating a first intermediate level of UXM, L3 indicating a second intermediate level of UXM, and L4 indicating a highest level of UXM.

At block 204, one or more UX parameters may be associated with each of the hierarchical UXM levels. The assignment module 120 may be configured to associate the UX parameters based on which the UX may be assessed for a particular UXM level. In an implementation, the present subject matter may include a UXM model (UXMM) that may be based on the one or more UX parameters for assessing the UX at each of the hierarchical level. Examples of the one or more UX parameters may include, but are not limited to, ease of use, speed of use, accessibility, flexibility, help, recovery from errors, content, consistency, greater good, differentiator, and persuasiveness. Further, each of the one or more UX parameters may be associated with a weight based on the relevance of the one or more UX parameters.

In an implementation, each of the one or more UX parameters may include a plurality of attributes. The plurality of attributes may be understood as characteristics of each of the one or more UX parameters. For example, the UXMM may include a plurality of review questions based on which the software product may be assessed for each of the one or more UX parameters associated with the hierarchical UXM levels. The plurality of attributes may be provided ratings by expert reviewers, such as through the user device 104. The ratings may be provided based on various analysis techniques that may be conducted for identifying the UXM level of the software product. The analysis techniques that may be employed by the UXMM may include heuristic analysis, an expert evaluation, a mock-scenario based testing, a competitor benchmarking technique, and analysis of emotions of the users.

Further, at block 206, ratings provided to each of the plurality of attributes of the one or more UX parameters may be obtained, for example, by the evaluation module 122. As mentioned above, the ratings may be provided by the experts and may be based on a pre-defined scale. In an implementation, the ratings may be based on a frequency of occurrence of activities as described by the plurality of attributes. For example, if frequency of occurrence of an attribute is up to 10%, the attribute is considered as not occurred and a rating of 1 may be provided to that attribute. Further, a frequency of about 10% to about 40% may reflect that the attribute rarely occurs and may be rated as 2. In addition, if a frequency of occurrence for an attribute is about 40% to about 50%, the attributes is considered as sometimes occurring and may be rated as 3. Furthermore, a frequency of about 60% to about 80% may indicate that the attribute has most occurrences and therefore may be rated as 4. Moreover, when the frequency of occurrence is about 80% to about 100%, the attribute may be considered as always occurring and may be rated as 5.

At block 208, based on the ratings provided to each of the plurality of attributes, ratings may be determined for each of the one or more UX parameters, by the evaluation module 122. In an implementation, the ratings of each of the one or more UX parameters may be evaluated by the evaluation module 122 by calculating a mean value of the ratings provided to each of the plurality of attributes. For example, if the parameter 'Ease of Use' includes five attributes then the mean value of the ratings provided to the five attributes will be considered as the rating of the parameter 'Ease of Use'.

Thereafter, at block 210, it is determined whether the one or more UX parameters are associated with weights or not. If the weights are not associated, the method 200 moves on to block 212.

At block 212, the UX parameters which do not have a weight assigned thereto are assigned a default weight. For example, if three UX parameters amongst a total of five UX parameters are not assigned any weight, the assignment module 120 may assign a default weight of '1' to those three UX parameters.

Once it is determined that the one or more UX parameters are associated with some weight, the method 200 moves to block 214. At the block 214, a UXM score may be evaluated for the software product at a particular hierarchical UXM level. In an implementation, the UXM score may be evaluated by the evaluation module 122 by computing a weighted average of the ratings determined for each of the one or more UX parameters.

In said implementation, the software product may be first evaluated for the lowest hierarchical UXM level, L1. To do so, a weighted average of the ratings provided to the UX parameters applicable with respect to L1 are taken into consideration. Further, the UXMM may be configured to define a threshold value for each of the hierarchical UXM level. If the UXM score of the software product is greater than the threshold value defined for the particular hierarchical UXM level, the software product may be evaluated for the next hierarchical UXM level.

At block 216, it is determined whether the UXM score calculated for a particular hierarchical UXM level is greater than the threshold value or not. Consider an example, where the software product is being assessed for L1 and the threshold value for L1 is defined to be 50%. Further, assuming that the evaluation module 122 has calculated the UXM score of the software product for L1 to be 79%. In this example, the software product may be considered eligible for being categorized in L1 and therefore may be evaluated for the next hierarchical UXM level. Accordingly, if the UXM score is less than the threshold value for the hierarchical UXM level under consideration, the method 200 moves to block 218.

At block 218, the software product is categorized in a hierarchical UXM level that may be lower in hierarchy than the UXM level for which the software product was being assessed. However, in case when the software product is being assessed for L1 and does not meet the pre-defined threshold value, the software product is considered as not usable, as L1 is the lowest UXM level of the UXMM. It will be evident that the UXMM may be configured to assess the software product for a higher hierarchical UXM level only when the software product qualifies to be categorized into a lower hierarchical UXM level.

Further, at block 220, suggestions may be provided for overcoming various shortcomings of the software product due to which the software product could not qualify for the higher UXM level. In an implementation, the reporting module 124 may be configured to generate a report that may include suggestions for improving the software product.

Referring back to block 216, if the UXM score of the software product exceeds the threshold value pre-defined for that hierarchical UXM level, the method 200 moves to block 222. At the block 222, the software product may be categorized in at least that UXM level for which the UXM score of the software product was greater than the threshold value of that hierarchical UXM level.

Finally, at block 224, assessment of the software product is continued for higher hierarchical UXM levels in a manner as described above.

Although embodiments for user experience maturity level assessment have been described in language specific to structural features and/or methods, it is to be understood that the present subject matter is not necessarily limited to the specific features or methods described. Rather, the specific features and methods are disclosed as exemplary implementations for the UXM level assessment system.

We claim:

1. A method for assessing a user experience maturity (UXM) level of a software product, the method comprising:
   defining a set of hierarchical UXM levels, wherein the hierarchical UXM levels indicate a progressive increase in user experience maturity (UXM), and wherein the set of hierarchical UXM levels comprises a first level indicating lowest level of UXM, a second level indicating a first intermediate level of UXM, a third level indicating a second intermediate level of UXM, and a fourth level indicating a highest level of UXM;
   associating one or more UX parameters indicative of capabilities of the software product with each of the hierarchical UXM levels, wherein, based on relevance, each of the one or more UX parameters is assigned a weight, the one or more UX parameters comprising;

ease of use of the software product indicative of at least accessibility of content and functionalities of the software product and ease of data input into the software product;

speed of use of the software product wherein the speed of use is based on at least performance of one or more graphical user interfaces (GUIs) of the software product;

consistency in behavior of the software product;

content of the software product, wherein the content is based on a capability of the one or more GUIs of the software product to communicate at least one of information, warnings, and error messages;

flexibility of the software product relating to data entry and user authentication;

aesthetics of the software product indicative of legibility of one or more of content and data grids of the software product, ability of the software product to recover from errors, and a brand recall value associated with the software product;

determining ratings for each of the one or more UX parameters;

evaluating a UXM score of the software product based on the ratings, wherein the evaluating is based on at least one of a formative analysis, a summative analysis, a test-scenario based analysis, a competitor benchmarking analysis, and an emotional response analysis; and categorizing the software product in one of the hierarchical UXM levels based on the UXM score of the software product, wherein the software product is categorized if the UXM score is greater than a pre-defined threshold value for the associated hierarchical UXM level.

2. The method as claimed in claim 1 further comprising reporting shortcomings of the software product, wherein the shortcomings of the software product are identified based on the evaluated UXM score.

3. The method as claimed in claim 2, wherein the reporting comprises providing suggestions for overcoming the shortcomings of the software product, on determining the UXM score to be less than the pre-defined threshold value.

4. The method as claimed in claim 1 further comprising comparing two or more software products, based on the one or more UX parameters, to determine the UXM of the two or more software products.

5. The method as claimed in claim 1, wherein the determining comprises calculating a mean value of ratings provided to a plurality of attributes associated with the each of the one or more UX parameters.

6. The method as claimed in claim 1, wherein the evaluating comprises computing a weighted average of the ratings of the one or more UX parameters.

7. The method as claimed in claim 1, wherein the one or more UX parameters further comprises a learnability of the software product.

8. The method as claimed in claim 5, wherein the ratings are provided to each of the plurality of attributes based on a set of review questions.

9. The method as claimed in claim 8, wherein an assessment questionnaire comprising the set of review questions is created for each hierarchical UXM level.

10. A user experience maturity (UXM) level assessment system for determining user experience (UX) of a software product, the UXM level assessment system comprising:

a processor; and
a memory coupled to the processor, the memory comprising:
an assignment module configured to,
define a set of hierarchical UXM levels, wherein the hierarchical UXM levels indicate progressive increase in user experience maturity (UXM), and wherein the set of hierarchical UXM levels comprises a first level indicating lowest level of UXM, a second level indicating a first intermediate level of UXM, a third level indicating a second intermediate level of UXM, and a fourth level indicating a highest level of UXM;
associate one or more UX parameters indicative of capabilities of the software product with each of the hierarchical UXM levels, wherein, based on relevance, each of the one or more UX parameters is assigned a weight, the one or more UX parameters comprising:
ease of use of the software product indicative of at least accessibility of content and functionalities of the software product and ease of data input into the software product;
speed of use of the software product wherein the speed of use is based on at least performance of one or more graphical user interfaces (GUIs) of the software product;
consistency in behavior of the software product, content of the software product, wherein the content is based on a capability of the one or more GUIs of the software product to communicate at least one of information, warnings, and error messages, flexibility of the software product relating to data entry and user authentication,
aesthetics of the software product indicative of legibility of one or more of content and data grids of the software product,
ability of the software product to recover from errors, and
a brand recall value associated with the software product;
an evaluation module configured to,
determine ratings associated with each of the one or more UX parameters based on the ratings associated with a plurality of attributes of each of the one or more UX parameters, wherein the plurality of attributes is judged on a set of review questions, and wherein the set of review questions is used for creating an assessment questionnaire at each hierarchical UXM level;
evaluate a UXM score of the software product based on the ratings, wherein the evaluating is based on at least one of a formative analysis, a summative analysis, a test-scenario based analysis, a competitor benchmarking analysis, and an emotional response analysis; and
categorize the software product in one of the hierarchical UXM levels based on the UXM score of the software product, wherein the software product is categorized if the UXM score is greater than a pre-defined threshold value for the associated hierarchical UXM level.

11. The UXM level assessment system as claimed in claim 10 further comprises a reporting module configured to render shortcomings of the software product, wherein the shortcomings of the software product are identified based on the evaluated UXM score.

12. The UXM level assessment system as claimed in claim 11, wherein the reporting module is further configured to provide suggestions for overcoming the shortcomings of the software product, on determining the UXM score to be less than the pre-defined threshold value.

13. The UXM level assessment system as claimed in claim 10, wherein the evaluation module is further configured to compute a weighted average of the ratings of the one or more UX parameters for evaluating the UXM score.

14. The UXM assessment system as claimed in claim 10, wherein the evaluation module is further configured to compare two or more software products to determine the UXM of the two or more software products.

15. The UXM level assessment system as claimed in claim 10, wherein the one or more UX parameters further comprises a learnability of the software product.

16. The UXM level assessment system as claimed in claim 10, wherein the ratings are provided to each of the plurality of attributes based on a set of review questions.

17. The UXM level assessment system as claimed in claim 16, wherein an assessment questionnaire comprising the set of review questions is created for each hierarchical UXM level.

18. A non-transitory computer-readable medium having embodied thereon a computer program for executing a method comprising:
  defining a set of hierarchical user experience maturity (UXM) levels, wherein the hierarchical UXM levels indicate progressive increase in user experience maturity (UXM) and wherein the set of hierarchical UXM levels comprises a first level indicating lowest level of UXM, a second level indicating a first intermediate level of UXM, a third level indicating a second intermediate level of UXM, and a fourth level indicating a highest level of UXM;
  associating one or more UX parameters indicative of capabilities of the software product with each of the hierarchical UXM levels, wherein, based on relevance, each of the one or more UX parameters is assigned a weight, the one or more UX parameters comprising:
    ease of use of the software product indicative of at least accessibility of content and functionalities of the software product and ease of data input into the software product,
    speed of use of the software product wherein the speed of use is based on at least performance of one or more graphical user interfaces (GUIs) of the software product,
    consistency in behavior of the software product,
    content of the software product, wherein the content is based on a capability of the one or more GUIs of the software product to communicate at least one of information, warnings, and error messages,
    flexibility of the software product relating to data entry and user authentication,
    aesthetics the software product indicative of legibility of one or more of content and data grids of the software product,
    ability of the software product to recover from errors, and
    a brand recall value associated with the software product;
  determining ratings associated with each of the one or more UX parameters;
  evaluating a UXM score of the software product based on the ratings, wherein the evaluating is based on at least one of a formative analysis, a summative analysis, a test-scenario based analysis, a competitor benchmarking analysis, and an emotional response analysis; and
  categorizing the software product in one of the hierarchical UXM levels based on the UXM score of the software product, wherein the software product is categorized if the UXM score is greater than a pre-defined threshold value for the associated hierarchical UXM level.

19. The non-transitory computer-readable medium as claimed in claim 18, wherein the one or more UX parameters further comprises a learnability of the software product.

20. The non-transitory computer-readable medium as claimed in claim 18, wherein the ratings are provided to each of the plurality of attributes based on a set of review questions.

21. The non-transitory computer-readable medium as claimed in claim 20, wherein an assessment questionnaire comprising the set of review questions is created for each hierarchical UXM level.

* * * * *